(12) United States Patent
Liao

(10) Patent No.: US 7,744,757 B1
(45) Date of Patent: Jun. 29, 2010

(54) CONNECTION BETWEEN FILTERING CAP AND CONTAINER

(76) Inventor: I-Chung Liao, No. 15, Lane 160, Fongfu Rd., Taichung (TW)

( * ) Notice: Subject to any disclaimer, the term of this patent is extended or adjusted under 35 U.S.C. 154(b) by 0 days.

(21) Appl. No.: 12/273,872

(22) Filed: Nov. 19, 2008

(51) Int. Cl.
*B01D 27/08* (2006.01)
*B01D 35/30* (2006.01)
(52) U.S. Cl. .................. 210/232; 210/444; 210/450
(58) Field of Classification Search .......... 210/232, 210/444, 450
See application file for complete search history.

(56) References Cited

U.S. PATENT DOCUMENTS

| | | | | |
|---|---|---|---|---|
| 1,744,837 A | * | 1/1930 | Pelletier | 210/296 |
| 4,617,118 A | * | 10/1986 | Smart | 210/232 |
| 5,591,332 A | * | 1/1997 | Reid et al. | 210/235 |
| 5,744,030 A | * | 4/1998 | Reid et al. | 210/235 |

* cited by examiner

*Primary Examiner*—Thomas M Lithgow
(74) *Attorney, Agent, or Firm*—Pro-Techtor Int'l Services; Ralph Willgohs

(57) ABSTRACT

A filtering assembly includes a container and a filtering cap which is connected to a connection end of the container. A flange extends spirally from an outside of the connection end and includes a positioning portion which is the longest section of the flange. The filtering cap includes an inner skirt and an outer skirt, wherein the inner skirt has a groove defined in an inside thereof the flange can be engaged with the groove. The groove has a positioning port which is the deepest portion of the whole groove. A plurality of bosses extend from an inside of the outer skirt. The positioning portion is engaged with the positioning port and the bosses are engaged with the wave-shaped ring when the filtering cap is located onto the container.

1 Claim, 4 Drawing Sheets

CONNECTION BETWEEN FILTERING CAP AND CONTAINER

FIELD OF THE INVENTION

The present invention relates to a filtering assembly and more particularly, to a connection between the filtering cap and the container.

BACKGROUND OF THE INVENTION

A conventional filtering assembly generally includes a filtering cap which is connected to a container and water enters the filtering cap and filtered and received in the container. The filtering cap includes horizontal flanges which are slidably engaged with grooves defined in outside of the opening of the container so as to connect the cap to the container. There are notches defined in the grooves and the flanges can be engaged with the notches to lock the cap onto the container. However, when locking the cap to the container, the user has to push the cap downward and press a seal ring so as to lock the cap on the container, this might not be convenient for some users. Before the flanges engaged with the notches, a reaction force is generated due to the gap between the flanges and the notches, the reaction force may reduce the force applied on the seal ring and leak may happen. The conventional way to connect the cap to the container does not provide obvious signal to the user when the cap is locked onto the container so that the user might stop rotating the cap before the cap is locked. The cap is not located at a fixed position relative to the container so that when the cap is locked, the relative position between the cap and the container may vary, and the instruction labels on the container cannot be positioned to face the user every time.

The present invention intends to provide a filtering assembly comprising a filtering cap and a container, wherein the filtering cap can be locked to the container with a click sound generated when the filtering cap is rotated to the locked position.

SUMMARY OF THE INVENTION

The present invention relates to a filtering assembly which comprises a container with a filtering cap mounted to a connection end on an end of the container. A flange extends spirally from an outside of the connection end and has a positioning portion which is the longest section of the flange. A first inlet and a first outlet are defined through the connection end and two seal rings are mounted to two respective outsides of the first inlet and first outlet. A wave-shaped ring is located at an end surface of the container and the connection end extends from the end surface. The filtering cap has a second inlet and a second outlet defined in an outside thereof, the second inlet and the second outlet are located to communicate with the first inlet and the first outlet. An inner skirt and an outer skirt are located in the filtering cap. The inner skirt has a groove defined in an inside thereof and the flange is engaged with the groove. The groove has a positioning port which is the deepest portion of the whole groove. A plurality of bosses extend from an inside of the outer skirt. The positioning portion is engaged with the positioning port and the bosses are engaged with the wave-shaped ring when the filtering cap is located onto the container.

The primary object of the present invention is to provide a filtering assembly wherein the cap can be locked onto the container and a click sound is generated when the cap is at the locked position.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
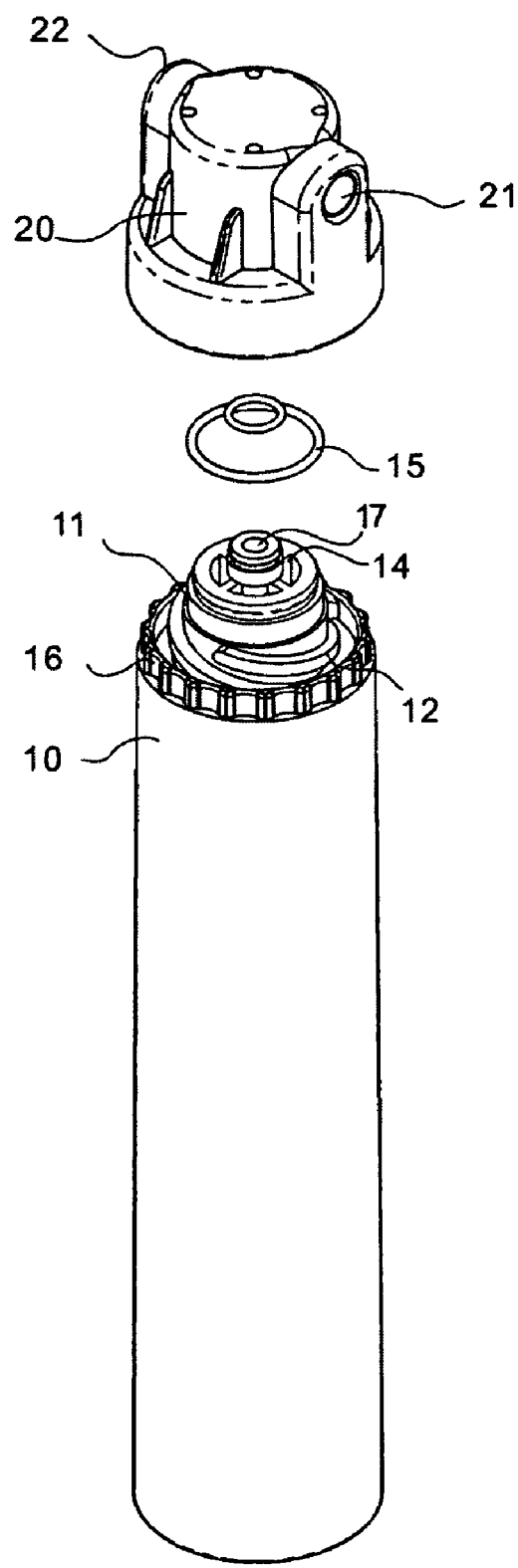
FIG. 1 is an exploded view to show the container and the filtering cap of the filtering assembly of the present invention.
Figure 2:
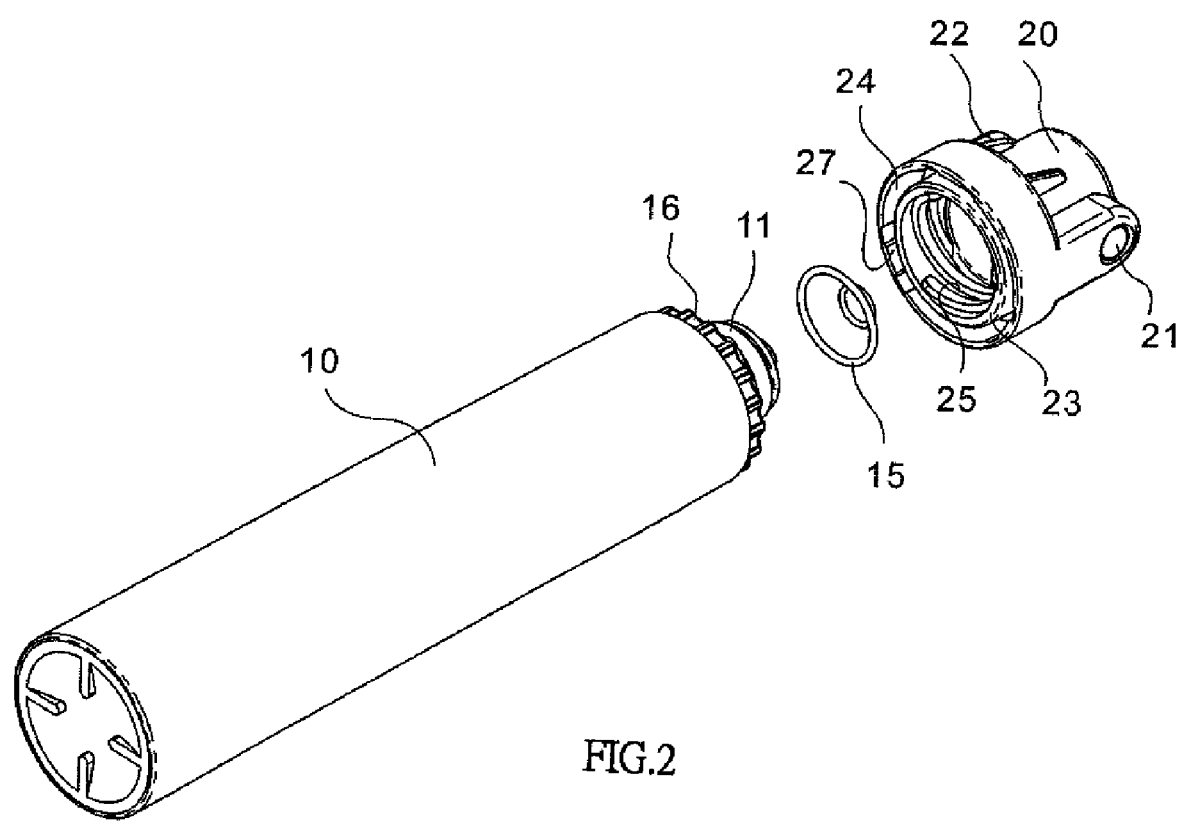
FIG. 2 is an exploded view to show the container and the filtering cap of the filtering assembly of the present invention from another angle.
Figure 3:
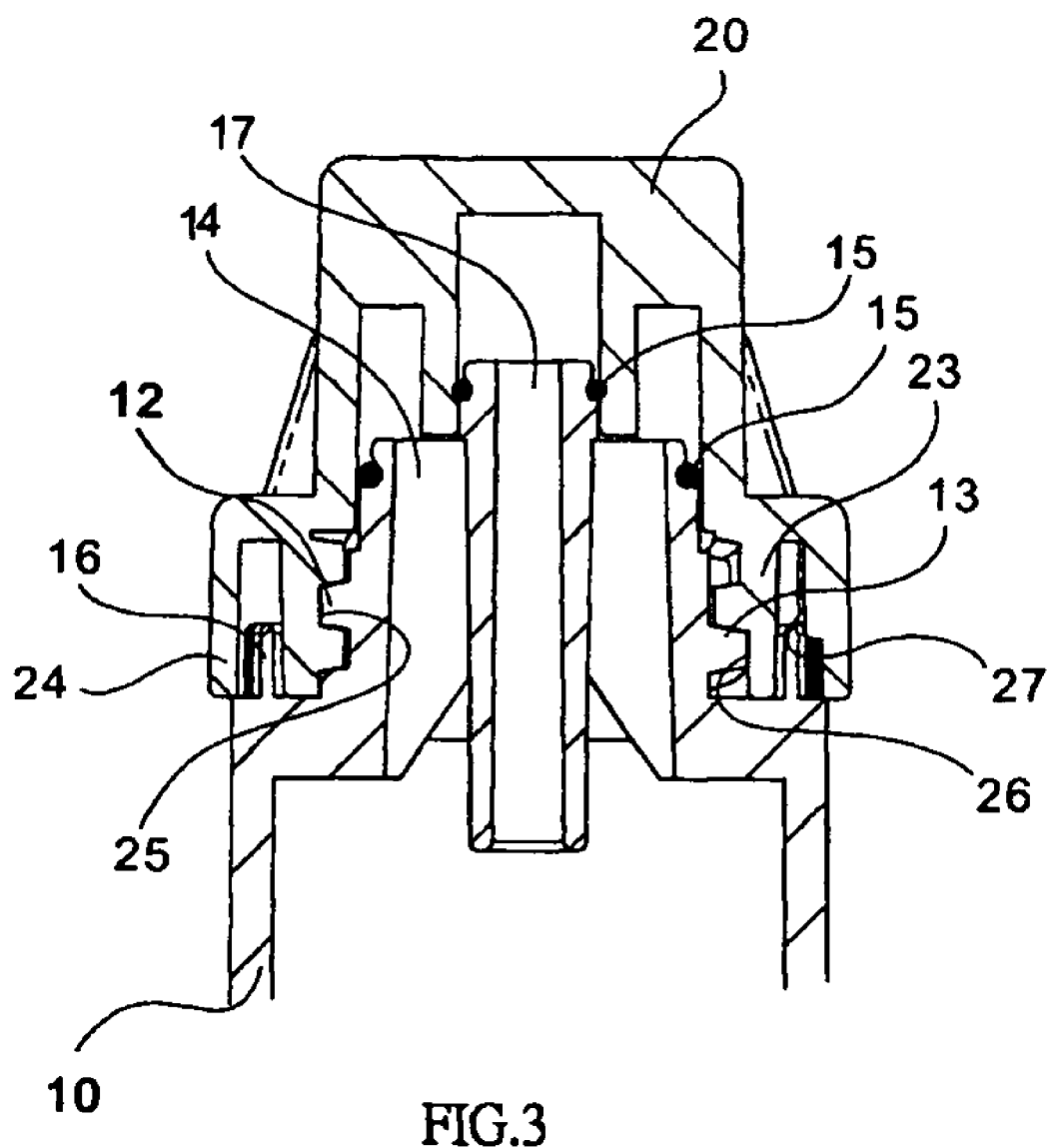
FIG. 3 is a cross sectional view to show the cap is connected to the container.

Referring to FIGS. 1 to 3, the filtering assembly of the present invention comprises a container 10 having a connection end 11 on an end thereof and a flange 12 extends spirally from an outside of the connection end 11. The flange 12 has a positioning portion 13 which is the longest section of the flange 12 and the positioning portion 13 is located at the beginning section of the flange 12. A first inlet 14 and a first outlet 17 are defined through the connection end 11 and two seal rings 15 are mounted to two respective outsides of the first inlet 14 and the first outlet 17. A wave-shaped ring 16 is located at an end surface of the container 10 wherein the connection end 11 extends from the end surface.

A filtering cap 20 has a second inlet 21 and a second outlet 22 defined in an outside thereof, the second inlet 21 and the second outlet 22 are located to communicate with the first inlet 14 and the first outlet 17 when the filter cap 20 is located at the opened position. An inner skirt 23 and an outer skirt 24 are located in the filtering cap 20. The inner skirt 23 has a groove 25 defined in an inside of the inner skirt 23 and the flange 12 can be engaged with the groove 25. The groove 25 has a positioning port 26 which is the deepest portion of the whole groove 25. A plurality of bosses 27 extend from an inside of the outer skirt 24.

Figure 4:
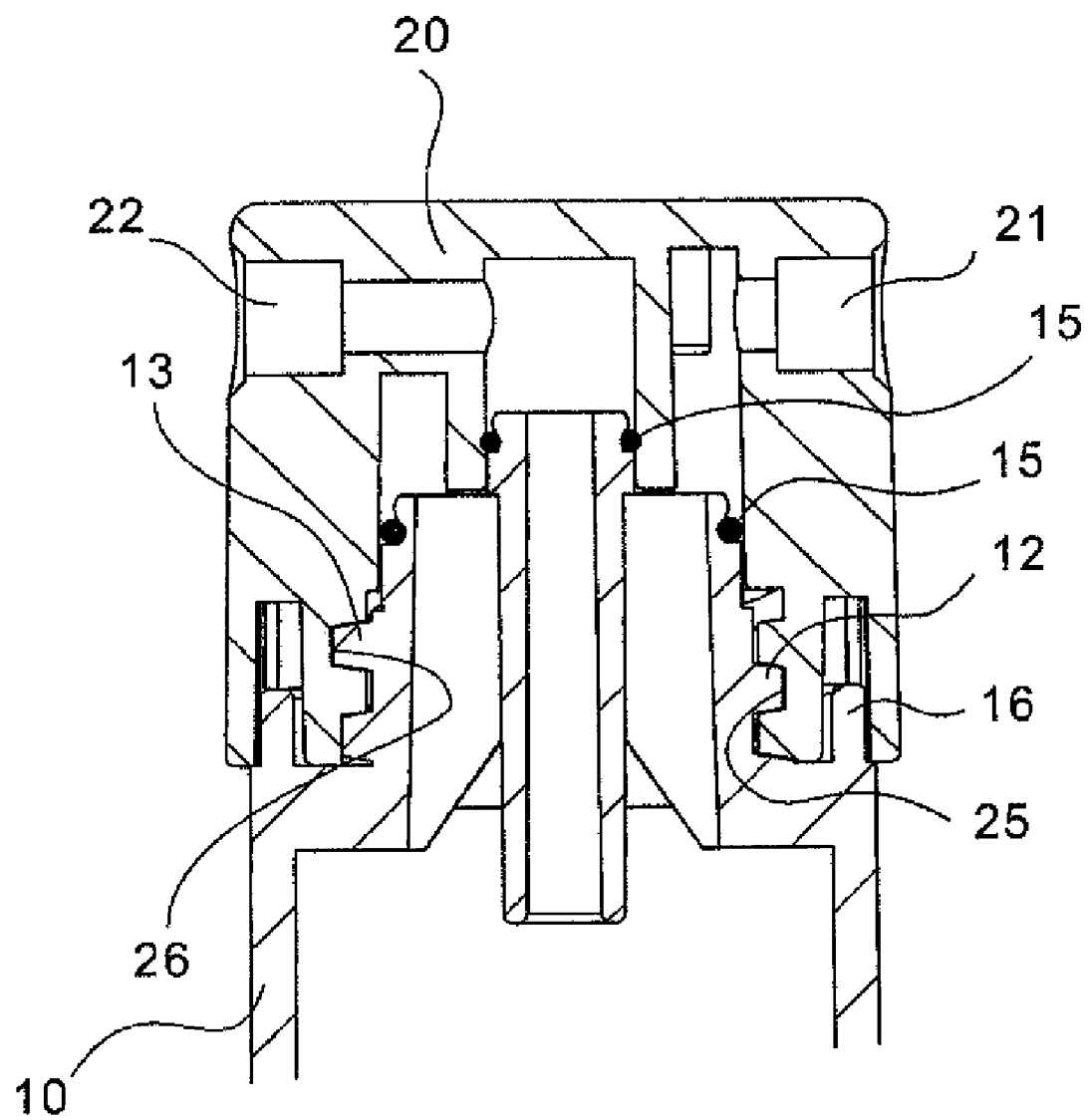
FIG. 4 is a cross sectional view to show that the cap is at the locked position on the container.

When the filtering cap 20 is at opened position, the first inlet 14 and first outlet 17 are in communication with the second inlet 21 and the second outlet 22 respectively as shown in FIG. 3. As shown in FIG. 4, when the filtering cap 20 is located onto the container 10 by rotating the filtering cap 20 toward the connection end 11, the positioning portion 13 is engaged with the positioning port 26 and the bosses 27 are engaged with the wave-shaped ring 16. When the bosses 27 contact the wave-shaped ring 16, at least one "click" sound is generated to acknowledge the user that the filtering cap 20 is at the lock position. At the lock position, the relative position between the filtering cap 20 and the container 10 is fixed. In other words, the instructions and labels on the container 10 are located to face the user when the filtering cap 20 is at the lock position.

While we have shown and described the embodiment in accordance with the present invention, it should be clear to those skilled in the art that further embodiments may be made without departing from the scope of the present invention.

What is claimed is:

1. A filtering assembly comprising:

a container having a connection end on an end thereof and a flange extending spirally from an outside of the connection end, the flange having a positioning portion which is the longest section of the flange, a first inlet and a first outlet defined through the connection end and two seal rings mounted to two respective outsides of the first inlet and the first outlet, a wave-shaped ring located at an end surface of the container and the connection end extending from the end surface; and a filtering cap having a second inlet and a second outlet defined in an outside thereof, the second inlet and the second outlet located communicating with the first inlet and the first outlet respectively, an inner skirt and an outer skirt located in the filtering cap, the inner skirt having a groove defined in an inside of the inner skirt and the flange engaged with the groove, the groove having a positioning port which is the deepest portion of the whole groove, a plurality of bosses extending from an inside of the outer skirt, the positioning portion being engaged with the positioning port and the bosses engaged with the wave-shaped ring when the filtering cap is located onto the container.

* * * * *